United States Patent

Juhue et al.

[11] Patent Number: 6,114,045
[45] Date of Patent: Sep. 5, 2000

[54] FLEXIBLE COATINGS WITH LOW SURFACE TACK AND SURFACE TENSION

[75] Inventors: Didier Juhue, Levallois-Perret; Baudouin Duque, Brionne, both of France

[73] Assignee: Elf Atochem S.A., France

[21] Appl. No.: 09/110,859

[22] Filed: Jul. 7, 1998

[30] Foreign Application Priority Data

Jul. 8, 1997 [FR] France .................................. 97 08666

[51] Int. Cl.⁷ ..................................................... B32B 27/08
[52] U.S. Cl. .................. 428/474.4; 428/521; 428/522; 428/421; 524/305; 524/251; 524/544; 526/245
[58] Field of Search .................. 428/474.4, 521, 428/522, 421; 524/805, 544, 251; 526/245

[56] References Cited

U.S. PATENT DOCUMENTS

| | | | |
|---|---|---|---|
| 2,270,024 | 1/1942 | Renfrew et al. | 260/32 |
| 5,308,820 | 5/1994 | Mori et al. | 502/167 |
| 5,346,949 | 9/1994 | Fukazawa | 524/805 |
| 5,623,041 | 4/1997 | Boucher | 526/329.2 |

FOREIGN PATENT DOCUMENTS

| | | |
|---|---|---|
| 572269 | 12/1993 | European Pat. Off. . |
| 2275721 | 4/1996 | France . |
| 55-29501 | 3/1980 | Japan . |
| 4-126707 | 4/1992 | Japan . |
| 5-017538 | 1/1993 | Japan . |
| 5-140237 | 6/1993 | Japan . |
| WO 95/01228 | 1/1995 | WIPO . |

OTHER PUBLICATIONS

French Search Report dated Feb. 3, 1998.
NEN–ISO 37, Rubber, vulcanized or thermoplastic—Determination of tensile stress–strain properties, Nederlands Normalisatie Instituut 1994, pp. 1–12 (English) with cover sheets (3).

*Primary Examiner*—Leszek Kiliman
*Attorney, Agent, or Firm*—Smith, Gambrell & Russell

[57] ABSTRACT

The invention relates to the films obtained by applying and drying a latex based on special acrylic monomers. These coatings are both flexible and have low surface tack and surface tension. The low tack and hydrophobic nature are provided by the special acrylic monomers. The field of application of the invention is that of the surface coatings industry.

14 Claims, No Drawings

FLEXIBLE COATINGS WITH LOW SURFACE TACK AND SURFACE TENSION

FIELD OF THE INVENTION

The invention relates to surface coatings such as varnishes and paints, in particular coatings for construction materials such as bricks, concrete, stones, glass, metals and plastics. It relates in particular to flexible coatings having low surface tack and surface tension. It also relates to the latexes which, after application and drying, lead to the coatings of the invention, as well as to the processes for preparing latexes of this type.

BACKGROUND OF THE INVENTION

The term latex is intended to mean aqueous dispersions of polymer particles, as obtained by polymerization in emulsion.

Most latexes for flexible coatings are based on polymers which have a low glass transition temperature, denoted Tg. The films or coatings resulting from latexes of this type generally have a surface tack which is fairly high and therefore prohibitive for many applications, in particular because they accumulate dirt.

The most common solution for reducing the tack, apart from increasing the Tg at the sacrifice of flexibility, is to cross-link the films chemically or photochemically. This solution is not entirely satisfactory.

Another solution is described by U.S. Pat. No. 5 308 820. It consists in mixing a dispersion of a "hard" polymer which provides the low tack and a dispersion containing a "soft" polymer which provides flexibility.

Furthermore, films may be rendered hydrophobic, or their surface tension may be reduced, by adding hydrophobic polymers such as polymers containing silicone. However, these do not correct the tendency to accumulate dirt, because they have a low Tg and are oleophilic.

Another solution is to introduce fluoropolymers, as described in FR 2 725 721.

It therefore seems difficult, or even impossible to find a coating which, at the same time, is flexible, hydrophobic and has low tack.

The object of the invention is therefore to develop coatings which meet the criteria mentioned above.

DESCRIPTION OF THE INVENTION

This object has been achieved, surprisingly, with the aid of aqueous dispersions of acrylic polymers, capable of being obtained by polymerization in emulsion or suspension of one or more monomers comprising special acrylic monomers.

When applied to any support, and after drying and the formation of a film, these latexes give a flexible coating which has low surface tack and surface tension.

The present invention therefore firstly relates to a flexible coating having low surf ace tack and low surface tension.

The flexibility according to the invention is the elongation at break of a film, expressed in % and determined according to the protocol described in Example 4.

The surface tack according to the invention is measured according to a standard internal to the Applicant company and expressed in J/m². The measuring protocol is described in Example 4.

The degree to which it is hydrophobic is characterized by the contact angle, expressed in degrees, formed by a water drop and the film.

The films of the invention have, at the same time:

flexibility of more than 1000% and preferably more than 1900% surface tack less than 95 J/m$^2$ and preferably less than 85 J/m$^2$;

and are hydrophobic to an extent expressed by a contact angle of more than 90° and preferably between 100 and 120°.

Compared with a coating obtained from a reference polymer with equal Tg, the coating of the invention has the same flexibility, a reduction in surface tack and is more hydrophobic.

The coatings of the invention contain:

from 60 to 99.5% by weight, and preferably from 70 to 98%, of units resulting from one or more monomers (A) selected from the group I consisting of:

(meth)acrylic esters such as methyl methacrylate, butyl methacrylate, 2-ethylhexyl acrylate (meth)acrylic acids acrylamide and its derivatives vinyls styrenes such as styrene and its derivatives, and from 0.5 to 40% by weight, and preferably from 2 to 30%, of one or more monomers (B) selected from the group II consisting of:

perfluoro monomers ($B_1$) satisfying the general formula:

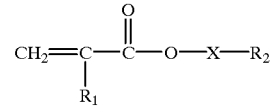

in which $R_1$ represents a hydrogen atom or an alkyl radical containing from 1 to 4 carbon atoms, $R_2$ represents a perfluoroalkyl radical with straight or branched chain containing from 1 to 16 carbon atoms, X represents a divalent sequence bonded to O by a carbon atom and capable of including one or more oxygen, sulphur and/or nitrogen atoms (meth)acrylic monomers ($B_2$) satisfying the general formula:

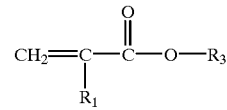

in which $R_3$ represents an alkyl radical containing from 8 to 30 carbon atoms, and preferably from 18 to 24 carbon atoms.

According to an advantageous form of the invention, A is 2-ethylhexyl acrylate.

The preferred monomers (B) of the invention are, in the case of $B_1$, 2-ethylperfluorooctyl acrylate, referred to below as AC8, and behenyl acrylate in the case of $B_2$.

The monomers (A) form the matrix of the coating and are selected such that the Tg of the coating stays close to −40° C. The monomers (B) are selected for their hydrophobic properties. The amounts of monomers (A) and (B) are defined so that the coating has sufficient flexibility at the working temperature. This temperature clearly depends on the application. For example, in the case of an outdoor application such as exterior paint for a building, the working temperature is between −20 and 60° C.

The present invention also relates to a latex consisting of a dispersion of particles or a mixture of dispersions of particles. These dispersions are obtained by the polymerization in emulsion in an aqueous medium, in at least one step, of at least one monomer A selected from group I and at least one monomer B selected from group II. Groups I and II are those defined above.

The particles in dispersion consist of one or more different polymers. The monomer(s) B may be distributed over one or more polymers.

According to one form of the invention, all of (B) is distributed over all the polymers of the particles in dispersion. This form is achieved when the polymerization is carried out on a mixture of monomers containing A and B.

According to another form, a stepwise procedure may be adopted, by mixing the dispersion obtained according to the first form of the invention with at least one other dispersion obtained by the polymerization of at least one monomer A.

Irrespective of the form of the invention, the particles in dispersion contain:

from 60 to 99.5% by weight, and preferably from 70 to 98%, of at least one monomer A selected from group I from 0.5 to 40% by weight, and preferably from 2 to 30%, of at least one monomer B selected from group II.

In general, the units resulting from the monomers B are distributed statistically in the polymer containing them. However, by modifying the synthesis process, part of the polymer may be enriched with monomer B. This will result in the creation of an excess concentration of fluoropolymer, thus improving their general behaviour.

The invention also relates to a process for synthesizing latex. This process is based on the techniques of polymerization in emulsion which are well-known to the person skilled in the art. The reaction is thus preferably carried out under an inert atmosphere in the presence of radical initiators. The initiation system used may be a redox system such as $Na_2S_2O_8$, $(NH_4)_2S_2O_8/NA_2S_2O_5$, $Na_2SO_3$, or a thermal system such as $(NH_4)_2S_2O_8$, the amounts used being between 0.2 and 10% by weight relative to the total mass of monomers, preferably between 0.25 and 0.5% by weight.

The reaction for the polymerization in emulsion according to the invention is carried out at a temperature of between 65 and 85° C. and depends on the type of initiation system used: 65–75° C. in the case of redox systems based on peroxodisulphate and metabisulphite, and 70–85° C. for thermal systems based on peroxodisulphate alone.

The preparation of the latexes according to the invention is carried out according to a process of the semicontinuous type, making it possible to limit the drifts in composition which depend on the differences in reactivity of the various monomers. The introduction of the monomers in the form of a pre-emulsion with some of the water and the surfactants is thus generally carried out over a time period of from 3½ hours to 5 hours. It is also useful, although not essential, to carry out seeding with 1 to 15% of the monomers. The emulsifier systems used in the process of polymerization in emulsion according to the invention are selected from the range of emulsifiers having a suitable hydrophilic/lipophilic balance. The preferred systems consist of the combination of an anionic surfactant, such as sodium lauryl sulphate, ethoxylated nonylphenol sulphates in particular with 20–25 moles of ethylene oxide, benzene dodecylsulphonate and ethoxylated fatty alkyl sulphates, and a non-ionic surfactant such as ethoxylated nonylphenols, in particular with 10–40 mol of ethylene oxide, and ethoxylated fatty alcohols.

The total amount of emulsifier is generally in the range of from 1 to 5% by weight, and preferably from 2 to 4% by weight relative to the monomers.

The latexes according to the invention are preferably prepared according to a so-called "shot" process, which consists in introducing the monomer B in rapid successive pouring operations, with the aim of creating regions which are rich in B, as explained above.

The particles in dispersion according to the invention have a diameter of between 50 and 500 nm.

The latexes as described above can be applied to any support, and, after drying, lead to the films or coatings of the invention. They may also be mixed with dyes, inorganic or organic fillers or any other additive to constitute a formulation for surface coatings such as paint, varnish, mastic, etc.

EXAMPLES

The following examples illustrate the invention without limiting it:

Example 1

Preparation of the latexes A, B and C

The binders were synthesized conventionally according to a semicontinuous polymerization process by simultaneous and separate addition of an initiator solution and a pre-emulsion to a base stock which had been heated beforehand to 75° C. and was contained in the reactor, the latter being equipped with a system for circulating hot water in the double jacket, with a central stirring system and with a condenser.

Certain syntheses were carried out in a medium buffered by sodium bicarbonate which, in this case, had been introduced into the pre-emulsion.

Procedure

Introducing the base stock into the reactor, homogenizing and heating to 75° C.

When the temperature of the base stock reaches 75° C., pouring the pre-emulsion and the initiator solution over 4 h.

Allowing the reaction to continue for a further hour at 75° C.

Cooling to room temperature, and filtering on 100 micron cloth.

Example 2

Preparation of the latex D

Identical to Example 1, except that the monomer B is introduced in successive waves.

Example 3

Preparation of the latex E

The latex E is obtained by mixing the latexes A and C in a ratio of 83/17.

The following table summarizes the procedures adopted for preparing the various latexes (see Table 1).

Example 4

Tests

All the latexes prepared were subjected to the following tests:

1. Flexibility

The flexibility of the latexes was evaluated by tension/elongation of 1.6 mm thick films dried for 15 days. The latexes are released from the mould after having been put in a freezer so as to overcome the tack and to avoid exerting a pre-deformation on the products, which are very soft at room temperature.

The samples are cut off with a hollow punch ISO 1/2 (polymers Tg =−40° C.), the tensile strain rate being 200 mm/min.

2. Surface tack

The surface tack is measured using the surface tack probe customarily used for PSAs (pressure sensitive adhesives). The probe (of cylindrical shape ⌀ 5 mm) comes into contact with the surface of the polymer for a chosen period of time (from a few seconds to a few minutes) and is then withdrawn at a selected set speed (from 0.01 cm/s to 5 cm/s). As the probe is being withdrawn, the force which the film exerts on it is recorded as a function of the displacement (cm). The measurement of the surface tack ($J/m^2$) is given by the energy calculated by integration of the force/displacement curve.

3. Hydrophobic nature or surface tension

The hydrophobic nature of the latexes is quantified by measuring the contact angle made by a water drop with the surface of the films.

The results obtained appear in Table 2 below:

TABLE 1

| Reference polymer without hydrophobic monomer (0% HM) Latex A | Polymer with continuous addition of 5% AC8 Latex B | Polymer with addition in 3 brief operations of 5% AC8 each Latex D | Polymer with continuous addition of 30% AC8 Latex C | Polymer made by mixing 83.7% of reference and 16.3% of polymer with 30% AC8 added continuously Latex E |
|---|---|---|---|---|
| 75% AE2H | 71% AE2H | 71% AE2H | 51.7% AE2H | 71% AE2H |
| 23% MAM | 21% MAM | 21% MAM | 15.3% MAM | 21% MAM |
| 2% acrylamide | 2% acrylamide | 2% acrylamide | 2% acrylamide | 2% acrylamide |
| 1% acrylic acid | 1% acrylic acid | 1% acrylic acid | 1% acrylic acid | 1% acrylic acid |
|  | 5% AC8 | 5% AC8 | 30% AC8 | 5% AC8 |
| 4 hours continuous pouring of the pre-emulsion | 4 hours continuous pouring of the pre-emulsion | 1 hour of pouring the pre-emulsion without AC8 | 4 hours continuous pouring of the pre-emulsion | |
| 1 hour of heating | 1 hour of heating | Addition of the pre-emulsion containing AC8 in 5 min | 1 hour of heating | |
|  |  | 1 hour of pouring the pre-emulsion without AC8 |  | |
|  |  | Addition of the pre-emulsion containing AC8 in 5 min |  | |
|  |  | 1 hour of pouring the pre-emulsion without AC8 |  | |
|  |  | Addition of the pre-emulsion containing AC8 in 5 min |  | |
|  |  | 1 hour of pouring the pre-emulsion without AC8 |  | |
|  |  | 1 hour of heating |  | |

TABLE 2

| (*) | A 0% AC8 reference | B 5% AC8 homogeneous | C 30% AC8 homogeneous | D 5% AC8 shot | E = A + C 5% AC8 mixture |
|---|---|---|---|---|---|
| Tg (± 3° C.) | −36 | −40 | −34 | −39 | −36 |
| Elong. at break (%) | 2300 | 2100 | 1900 | 1900 | 2000 |
| Surface tack ($J/m^2$) | 95 | 81 | 40 | 69 | 65 |
| ⊖ water (°) | 90 | 101 | 115 | 107 | 106 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Surface coating film based on a polymer containing a (meth)acrylic monomer which is hydrophobic, comprising the following properties:
    a breaking elongation of greater than 1000%,
    a surface tack of less than 95 J/m² and
    a contact angle with a water drop of greater than 90°,
    wherein said film further comprises:
from 60 to 99.5% by weight of units resulting from one or more monomers (A) selected from the group I consisting of:
    (meth)acrylic esters selected from the group consisting of methyl methacrylate, butyl methacrylate and 2-ethylhexyl acrylate,
    (meth)acrylic acid,
    acrylamide and
    styrene, and from 0.5 to 40% by weight of one or more monomers (B) selected from the group II consisting of:
    polyfluoromonomers ($B_1$) satisfying the formula:

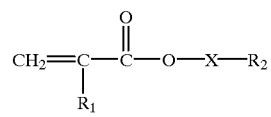

wherein $R_1$ represents a hydrogen atom or an alkyl radical containing from 1 to 4 carbon atoms, $R_2$ represents a perfluoroalkyl radical with straight or branched chain containing from 1 to 16 carbon atoms, X represents a divalent sequence bonded to O by a carbon atom and including one or more oxygen, sulphur and nitrogen atoms, and
    (meth)acrylic monomers ($B_2$) satisfying the formula:

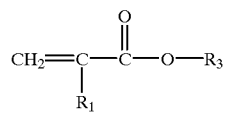

wherein $R_3$ represents an alkyl radical containing from 8 to 30 carbon atoms.

2. Film according to claim 1, wherein said film has a glass transition temperature of close to −40° C.

3. Film according to claim 1, wherein the monomer A is 2-ethylhexyl acrylate.

4. Film according to claim 1, wherein the monomer B is 2-ethylperfluorooctyl acrylate or behenyl acrylate.

5. Film according to claim 1, wherein said film has a breaking elongation greater than 1900%, a surface tack of less than 85 J/m²· and a contact angle between 1000 and 120°.

6. Film according to claim 1, wherein said film contains 70 to 98% of units resulting from one or more monomers (A) and 2 to 3% of one or more monomers (B) and $R_3$ contains from 18 to 24 carbon atoms.

7. Latex containing polymer particles of diameter between 50 and 500 nm, said particles comprising:
from 60 to 99.5% by weight of units resulting from one or more monomers (A) selected from the group I consisting of:
    (meth)acrylic esters selected from the group consisting of methyl methacrylate, butyl methacrylate and 2-ethylhexyl acrylate,
    (meth)acrylic acid,
    acrylamide and
    styrene, and from 0.5 to 40% by weight of one or more monomers (B) selected from the group II consisting of:
    polyfluoromonomers ($B_1$) satisfying the formula:

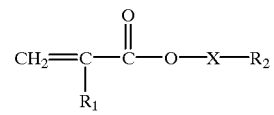

wherein $R_1$ represents a hydrogen atom or an alkyl radical containing from 1 to 4 carbon atoms, $R_2$ represents a perfluoroalkyl radical with straight or branched chain containing from 1 to 16 carbon atoms, X represents a divalent sequence bonded to O by a carbon atom and including one or more oxygen, sulphur and nitrogen atoms, and
    (meth)acrylic monomers ($B_2$) satisfying the formula:

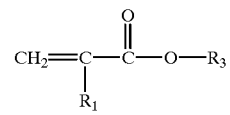

wherein $R_3$ represents an alkyl radical containing from 8 to 30 carbon atoms.

8. Latex according to claim 7, wherein the monomer A is 2-ethylhexyl acrylate.

9. Latex according to claim 7, wherein the monomer B is 2-ethylperfluorooctyl acrylate or behenyl acrylate.

10. Latex according to claim 7, wherein the monomer B is distributed through all the particles in dispersion.

11. Latex according to claim 7, wherein the monomer B is concentrated in some of the particles in dispersion.

12. Process for obtaining the latexes of claim 7 by polymerization in emulsion, wherein the monomer B is introduced during the polymerization by successive rapid pouring operations.

13. Surface treatment process comprising treating a surface with a latex according to claim 7.

14. Latex according to claim 7, wherein there is from 70 to 98% of units resulting from one or more monomers (A) and from 2 to 30% of one or more monomers (B) and $R_3$ is from 18 to 24 carbon atoms.

* * * * *